United States Patent
Inugai et al.

(10) Patent No.: US 7,832,674 B2
(45) Date of Patent: Nov. 16, 2010

(54) TAPE CARTRIDGE

(75) Inventors: Yasuo Inugai, Ibaraki (JP); Keiji Ban, Ibaraki (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 120 days.

(21) Appl. No.: 11/954,171

(22) Filed: Dec. 11, 2007

(65) Prior Publication Data

US 2008/0164359 A1  Jul. 10, 2008

(30) Foreign Application Priority Data

Dec. 12, 2006  (JP)  .............................. 2006-334076

(51) Int. Cl.
  *G03B 23/04*  (2006.01)
(52) U.S. Cl. .................. 242/340; 242/338.1; 242/348
(58) Field of Classification Search ................ 242/338, 242/338.1, 611, 611.1, 340, 348, 347; 360/132; 206/308.3, 387.1
See application file for complete search history.

(56) References Cited

U.S. PATENT DOCUMENTS

| | | | | |
|---|---|---|---|---|
| 4,676,370 A | * | 6/1987 | Rudick | 206/1.5 |
| 5,297,754 A | * | 3/1994 | Albrecht et al. | 242/343 |
| 5,377,825 A | * | 1/1995 | Sykes et al. | 206/232 |
| 5,564,647 A | * | 10/1996 | Bay et al. | 242/608.8 |
| 5,913,420 A | * | 6/1999 | Morita | 206/308.3 |
| 6,154,342 A | * | 11/2000 | Vanderheyden et al. | 360/132 |
| 6,411,466 B1 | * | 6/2002 | Shima et al. | 360/132 |
| 6,452,747 B1 | * | 9/2002 | Johnson et al. | 360/132 |
| 6,499,686 B2 | * | 12/2002 | Tsuyuki et al. | 242/348 |
| 6,618,224 B2 | * | 9/2003 | Cripps et al. | 360/132 |
| 6,869,037 B2 | * | 3/2005 | Hiraguchi | 242/348 |
| 6,929,208 B2 | * | 8/2005 | Kuhar et al. | 242/348 |
| 7,032,853 B2 | * | 4/2006 | Hiraguchi | 242/340 |
| 7,334,751 B2 | * | 2/2008 | Suzuki | 242/340 |
| 7,600,710 B2 | * | 10/2009 | Sumiya et al. | 242/611.1 |
| 2005/0274839 A1 | * | 12/2005 | Sasaki et al. | 242/338.1 |
| 2007/0200020 A1 | * | 8/2007 | Suzuki | 242/348 |
| 2008/0135664 A1 | * | 6/2008 | Hiraguchi et al. | 242/348.1 |
| 2008/0164359 A1 | * | 7/2008 | Inugai et al. | 242/348.2 |
| 2009/0218430 A1 | * | 9/2009 | Mori | 242/348 |

FOREIGN PATENT DOCUMENTS

| | | |
|---|---|---|
| JP | 63-164869 U | 10/1988 |
| JP | 5-33377 U | 4/1993 |

* cited by examiner

*Primary Examiner*—Evan H Langdon
(74) *Attorney, Agent, or Firm*—Birch, Stewart, Kolasch & Birch, LLP

(57) ABSTRACT

A tape cartridge has a tape housing, first and second reel member cooperate with each other to constitute a reel around which a tape is wound, a connecting and biasing member connecting between the first and second, and first and second engaging means. The first engaging means is provided on an inner surface of the lower wall. The second engaging means is provided on a lower surface of the second reel member. This arrangement allows that the second engaging means can engage with the first engaging means due to a biasing force caused by the connecting and biasing member to prevent a rotation of the second reel member and can disengage from the first engaging means when the drive shaft accesses the second reel member through the opening and forces the second reel member toward the first reel member against the biasing force of the connecting and biasing member.

3 Claims, 5 Drawing Sheets

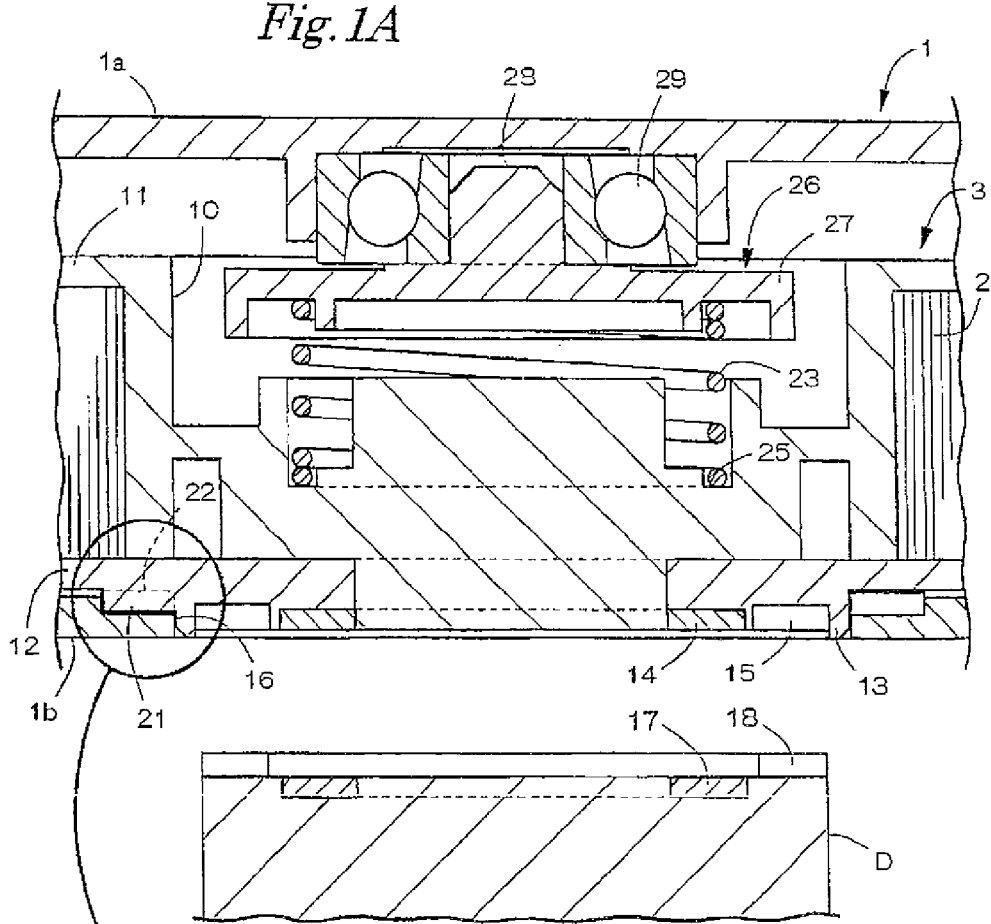
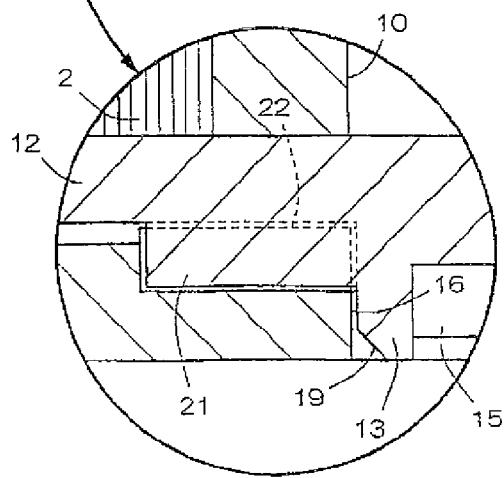

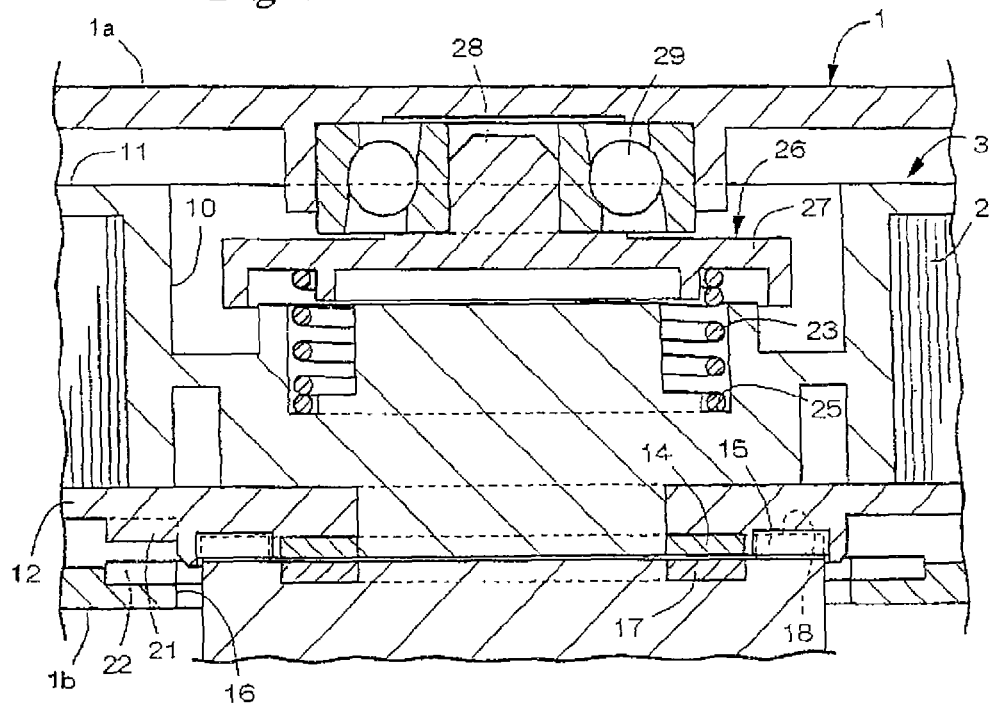
Fig.4
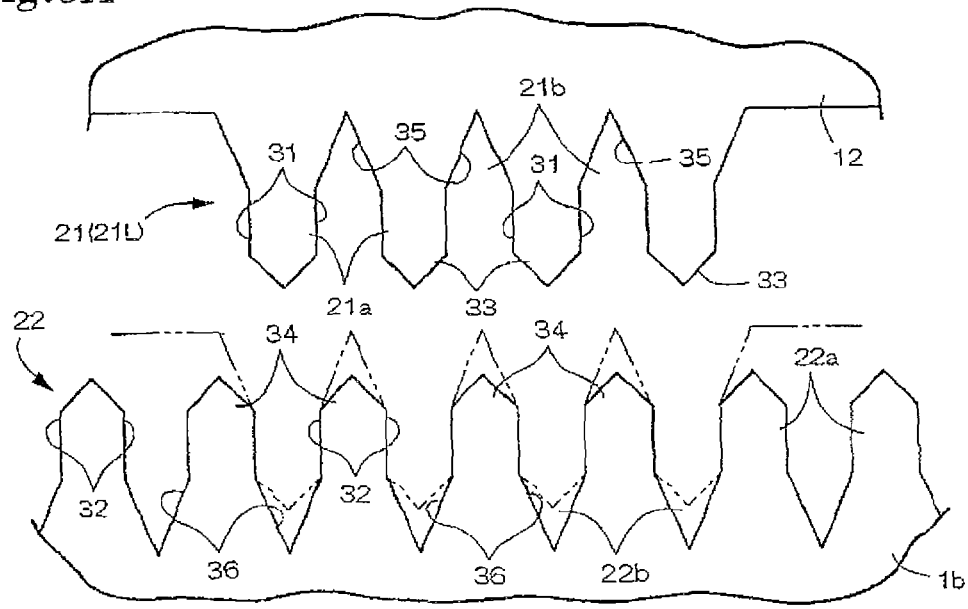
Fig.5A
Fig.5B

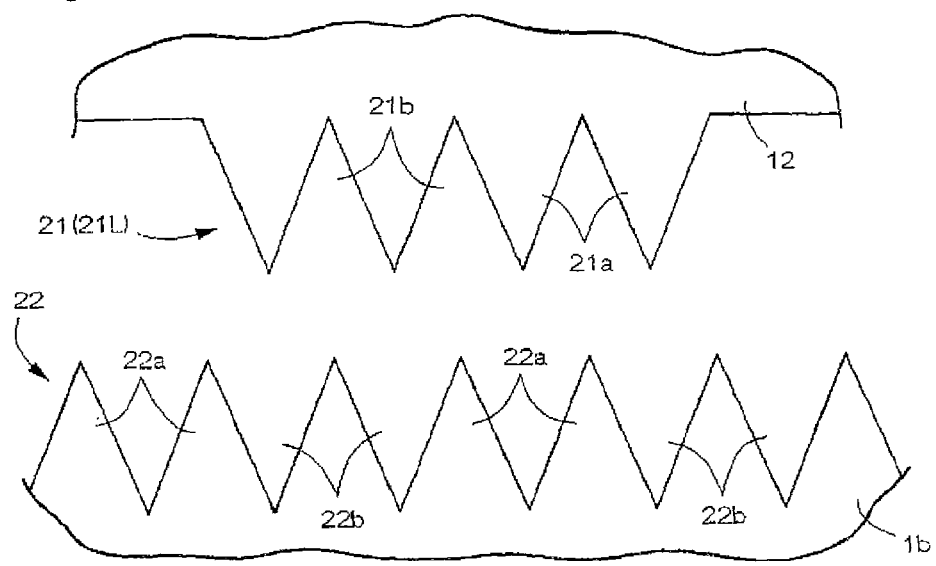
Fig.6A
Fig.6B
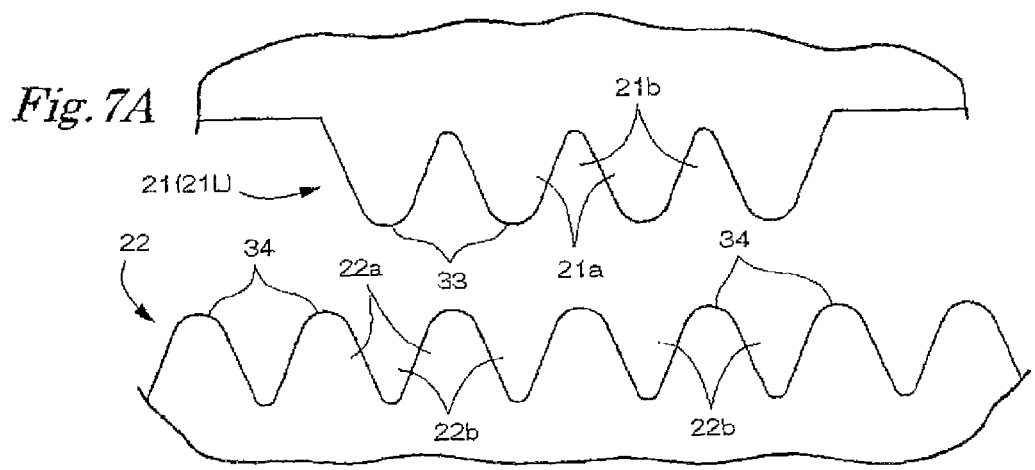
Fig.7A
Fig.7B

TAPE CARTRIDGE

FIELD OF THE INVENTION

The present invention relates to a single reel tape cartridge with a locking mechanism for locking a tape winding member or reel while not in use.

BACKGROUND OF THE INVENTION

Conventionally, a single reel tape cartridge incorporates a locking mechanism for preventing unnecessary rotations of a tape reel while not in use which would otherwise cause an unwanted tape slack.

For example, JP 2001-256756 A discloses a locking mechanism, called flange locking mechanism, having a gear formed on the outer peripheral surface of the reel flange and an associated gear formed on the locking lever pivotally mounted on the housing of the cartridge and capable of engaging and disengaging the gear of the reel to lock and unlock the reel.

Also, JP 2003-187548 A discloses another locking mechanism, called hub locking mechanism, having a gear formed on the central bottom surface of the hub and an associated gear formed on the opposing surface of the reel biasing member and capable of engaging and disengaging the gear of the hub to lock and unlock the reel.

Further, JP H05-225746 A discloses a tape cartridge with a flange-less tape winding member in which a hub lock mechanism is provided between an inner peripheral surface of the central opening defined in the bottom wall of the tape housing through which a drive mechanism is accessed and the hub of the tape winding member. A ring-like stopper is provided in the lower portion of the inner surface of the hub. Also, gears are provided on the lower peripheral surface of the stopper and the inner peripheral surface of the opening, respectively, and the stopper is biased by the compression spring to engage its gears with the associated gears on the opening. This prevents the relative rotation between the stopper and the hub but allows a relative sliding movement in the vertical direction. The upper end of the spring biasing the stopper into the locking position is received by the downwardly opened upper wall of the hub.

Each of above described conventional reel locking mechanisms needs independent locking lever or locking member, and/or the unlocking member, which results in an increase of the number of components required for the locking mechanism and the overall manufacturing cost of the tape cartridge.

SUMMARY OF THE INVENTION

A purpose of the present invention is to provide a cape cartridge with a locking mechanism for preventing unwanted rotations of the tape winding member which is a reliable and simple structure and capable of reducing an overall manufacturing cost of the tape cartridge.

Accordingly, an embodiment of the tape cartridge according to the present invention has a tape housing having an upper wall and a lower wall defining a tape housing, the lower wall having a circular opening defined therein through which a drive shaft can access;

a first reel member positioned in the tape housing and supported by the upper wall for rotation about an axis extending through a center of the circular opening;

a second reel member positioned in the tape housing and having an outer peripheral surface extending around the axis for winding the tape therearound;

a connecting and biasing member connecting between the first and second reel members so that a rotation of the second reel member causes a rotation of the first reel member and biasing the second reel member toward the lower wall;

a first engaging means provided on an inner surface of the lower wall; and a second engaging means provided on a lower surface of the second reel member so that the second engaging means can engage with the first engaging means due to a biasing force caused by the connecting and biasing member to prevent a rotation of the second reel member and can disengage from the first engaging means when the drive shaft accesses the second reel member through the opening and forces the second reel member toward the first reel member against the biasing force of the connecting and biasing member.

Either or both of the first and the second engaging means may have a number of teeth or teeth arrangements continuously or discretely arranged around the axis.

Preferably, each of the teeth of the first and second engaging means has an intermediate surface extending substantially parallel to the axis.

According to the embodiments of the tape cartridge of the present invention, a reliable locking and unlocking mechanism with a simple structure is provided to the tape cartridge.

BRIEF DESCRIPTION OF THE DRAWINGS

The present invention will become more fully understood from the detailed description and the accompanying drawings, wherein:

FIG. 1A is a partial enlarged vertical cross sectional view of a tape cartridge according to an embodiment of the present invention, in which a drive shaft is disengaged with a reel of the tape cartridge;

FIG. 1B is a partial enlarged cross sectional view of the tape cartridge shown in FIG. 1A;

FIG. 4 is a partial cross sectional view of the tape cartridge in which the drive shaft is engaged with the reel;

FIGS. 5A and 5B show arrangements of the first and second engaging means;

FIGS. 6A and 6B show another embodiment the first and second engaging means; and FIGS. 7A and 7B show another embodiment the first and second engaging means.

DETAILED DESCRIPTION OF THE PREFERRED EMBODIMENTS

The following description of the preferred embodiments is merely exemplary in nature and are in no way intended to limit the invention, its application, or uses.

Figure 2:
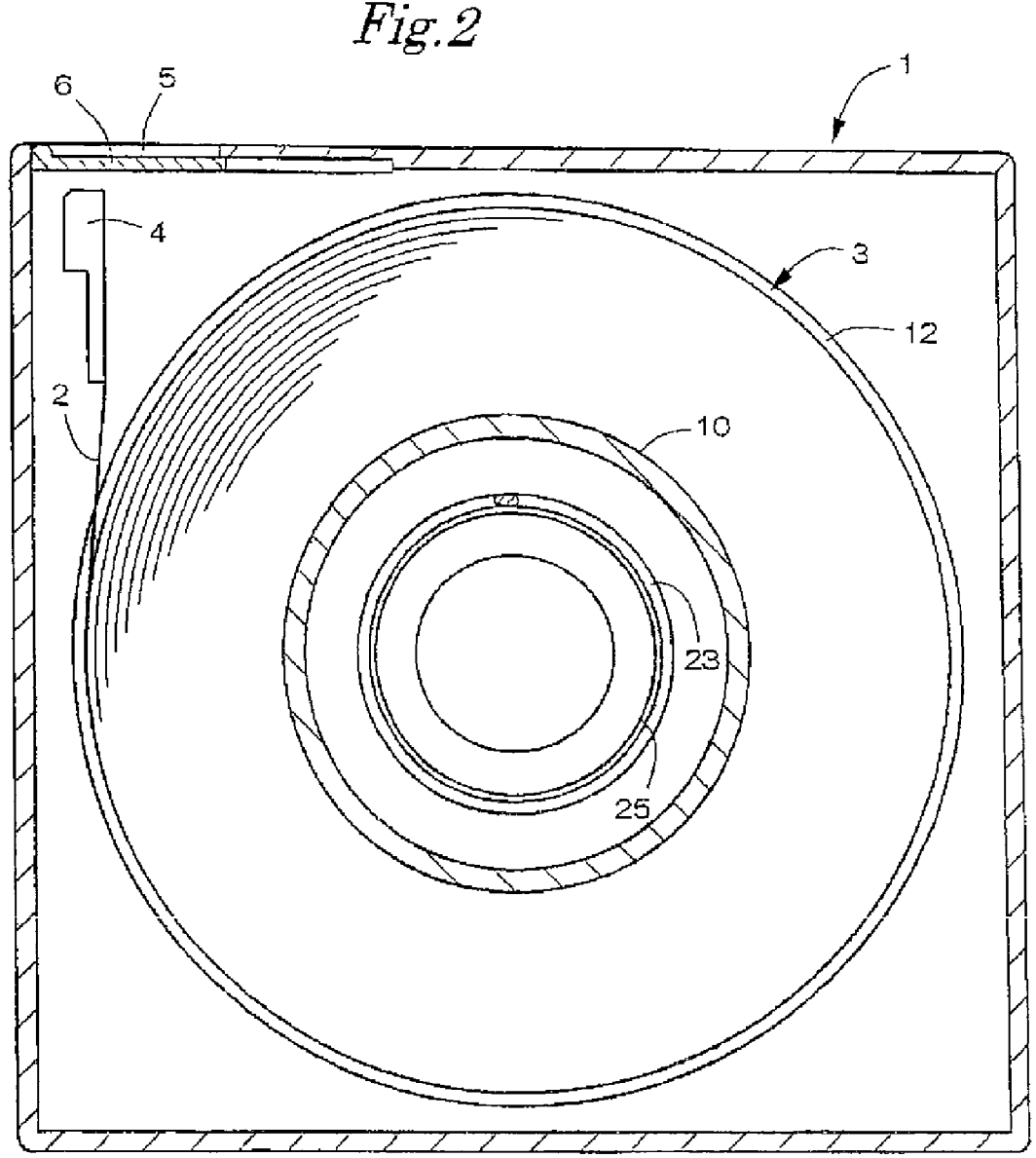
FIG. 2 is a horizontal cross sectional view of the tape cartridge shown in FIG. 1.

Referring to FIGS. 1A-5, there is shown an embodiment of the tape cartridge according to the present invention. In particular, as shown in FIG. 2, the tape cartridge includes a housing 1 in the form of substantially rectangular flat box. Preferably, the housing 1 has upper and lower housing portions 1a and 1b coupled to each other to form the housing 1. The housing 1 has an interior or tape housing defined between the upper and lower housing portions 1a and 1b for accommodating a single tape winding member or flanged reel 3 for winding and unwinding a strip of magnetic recording tape 2. The leading end of the tape 2 carries a leading block 4 fixed thereto, which is retained by a suitable means adjacent to a tape outlet 5 opened in the front wall of the housing 1. A shutter 6 is provided for closing the tape outlet 5 when not in use, which is biased by a spring (not shown) into the illustrated closed position.

Figure 3:
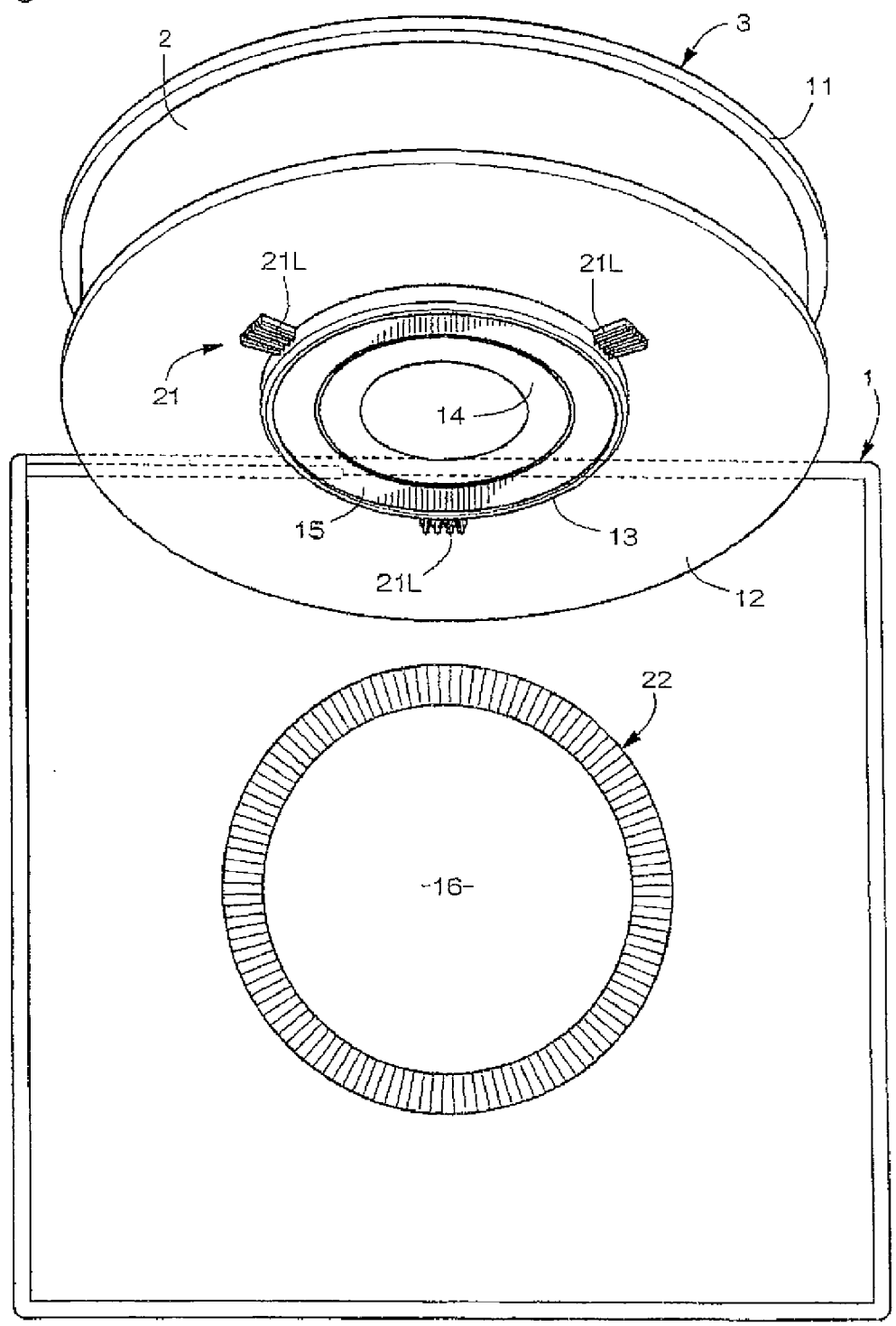
FIG. 3 is a diagram showing an engaging means provided in the housing and an associated engaging means provided on a reel.

Referring to FIGS. 1A, 1B and 3, the tape reel 3 has a rotatable reel member or hub 10. As is known in the art, the hub 10 includes a vertical cylindrical outer peripheral wall surface defined therewith and extending around a vertical central axis (not shown), for winding the tape therearound. The hub 10 supports upper and lower flanges 11 and 12 extending radially outwardly from the upper and lower outer peripheral portions thereof, respectively. On this embodiment, the upper flange 11 is formed integrally with the hub 10 and the lower flange 12 is formed as an independent part and securely assembled with the hub 10. The lower flange 12 has a cylindrical portion or wall 13 extending about the central axis (not shown) of the hub 10 for receiving a drive shaft D which will be coaxially aligned and then connected with the hub 10 for the transmission of the rotational forces from the drive shaft D to the reel 3. Preferably, the wall 13 is formed integrally on the lower surface of the lower flange 12.

A ring 14 made of magnetically attractable material is provided coaxially with and inside the cylindrical wall 13 and attached on the lower surface of the lower flange 12. Also, a transmission mechanism 15 is provided circularly and continuously around the ring 14 and inside the wall 13 on the lower surface of the lower flange 12. For example, the transmission mechanism 15 has a number of equally spaced teeth formed integrally with the lower flange 12 and arranged coaxially with the cylindrical wall 13. Alternatively, the transmission mechanism 15 may be made of an independent member and securely attached to an associated lower surface portion of the lower flange 12. As shown in FIGS. 1A and 1B, the lower housing portion 1b has a circular opening 16 in which the cylindrical wall 13 is fitted in so that the hub 10 can rotate about its axis (not shown) and also the circular ring 14 and the transmission mechanism 15 are exposed outside through the opening 16 for the connection with the drive shaft D. Preferably, the ring 13 has a chamfered guide portion 19 at the outer bottom peripheral edge thereof so that it can be readily guided into the opening 16.

As shown in FIG. 1A, the drive shaft D has a top end surface, preferably in the form of circular surface, including an associated magnetic ring 17 capable of magnetically attracting the ring 14 and an engaging portion 18 capable of engaging with the transmission mechanism 15. In this embodiment, the engaging portion 18 is preferably made of a number of teeth engageable with the associated teeth of the transmission mechanism 15.

To lock the reel 3 and thereby to prevent the rotation thereof when not in use, a first engaging means 21 is provided on the lower surface of the lower flange 12 and around the cylindrical wall 13 and an associated second engaging means 22 is provided on the upper surface of the lower housing 1b to oppose the first engaging means 21 so that first and second engaging means 21 and 22 can engage with and disengage from each other. As described in detail below, normally the hub 10 is forced downward by a connecting and biasing means such as a coil spring 23 so that the first and second engaging means 21 and 22 engage with each other to prevent the rotation of the reel 3.

Preferably, as best shown in FIG. 3 the second engaging nears 22 includes a number of teeth 22a arranged continuously adjacent and around the circular opening 16 of the lower housing 1b. The first engaging means 21, on the other hand, includes a plurality of, e.g., three, separate teeth arrangements 21L positioned at regular angular intervals around and adjacent the wall 13. As best shown in FIG. 5, each teeth arrangement 21L has a plurality of teeth 21a, e.g. four teeth, which are so shaped and sized that they can engage with the associated teeth 22a of the second engaging means 22. In this embodiment, the teeth arrangements 21L are integrally formed with the wall 13 on the lower surface of the lower flange 12.

This allows that the teeth 21a of the reel 3 downwardly forced by the coil spring 23 engage with the associate teeth 22a of the lower flange 12 to lock the reel 3 in its unrotatable position. This also allows that, when the drive shaft D is connected to the reel 3 and then forced toward the reel 3 against the biasing force of the coil spring 23 as indicated in FIG. 4, the teeth 21a are disengaged from the associated teeth 22a to allow the reel 3 to rotate with the rotation of the drive shaft D.

As shown in FIGS. 1A and 4, the lower end of the coil spring 23 is received by a spring support portion 25 in the form of cylindrical recess formed in and coaxially with the reel 3. The opposite upper end of the coil spring 23 is received by a rotatable reel member or support member 26 so that, when the first and second engaging means are disengaged from each other, the rotation of the hub 10 is well transmitted to the support member 26.

The support member 26 is supported by the upper housing portion 1a for rotation about the axis (not shown) of the hub 10. The support member 26, preferably made of plastic, has a seat plate 27. The seat plate 27 has a spring seat in the form of cylindrical groove defined in its lower surface for receiving the upper end of the coil spring 23. The support member 26 also has a central boss or bearing shaft 28 projecting upward from the center of the seat plate 27. The central boss 28 is supported for rotation about the axis of the hub 10 by a bearing 29 mounted on the lower surface of the upper housing 1a, so that the rotation of the hub 10 is well transmitted through the coil spring 23 to the support member 26. Preferably, a radial ball bearing as used for the bearing 29. This arrangement minimizes the rotational resistance of the support member 26, which in turn results in a smooth rotation of the reel 3.

FIGS. 5A and 5B show detailed structures of the first and second engagement means 21 and 22 having respective teeth 21a and 22a. Each tooth 21a of the first engaging means 21 has a mountain-like or moderate V-shaped distal portion 33, a pair of opposed intermediate vertical receiving surfaces 31 extending substantially parallel to the axis of the hub, and a pair of opposed proximal sharp slopes 35 each defining a sharp valley 21b with the opposed sharp slope 35 of the neighboring tooth. Likewise, each tooth 22a of the second engaging means 22 has a mountain-like or moderate V-shaped distal portion 34, a pair of opposed intermediate vertical receiving surfaces 32 extending substantially parallel to the axis of the hub, and a pair of opposed proximal sharp slopes 36 each defining a sharp valley 22b with the opposed sharp slope 36 of the neighboring tooth. Although not shown, each of the surfaces of the tooth extends radially outward from the central axis of the hub 10. This allows that, when the teeth 21a and 22a of the engaging means 21 and 22 are engaged with each other, the intermediate surfaces 31 and 32 mate with each other and, simultaneously, the sharp V-shaped valley 35, 36 and the opposing moderate V-shaped distal portions 33, 34 face each other to form a gap therebetween as shown 5B.

As described above, since each of the intermediate surface 31 of the reel 3 frictionally mates with and received by the corresponding intermediate surface 32 of the housing 1 when not in use, so that the rotation and/or the upward displacement of the reel 3 relative to the housing 1 is positively prohibited. Also, the distal portions 33 are maintained out of contact with the bottom of the associated valley while leaving the gap therebetween.

Although the configurations of the tooth 21a and 22a have been described in detail above, they are not limited thereto and may be modified in different ways.

For example, FIGS. 6A, 6B and 7A, 7B show other configurations of the tooth. In particular, in FIGS. 6A and 6B the teeth 21a, 22a have triangular configurations with the corresponding V-shaped valleys 21b, 22b formed therebetween. On the other hand, in FIGS. 7A and 7B the teeth 21a, 22a have rounded peaks and the corresponding rounded valleys.

Although in the previous embodiment the first engaging means 21 is made of teeth 21a arranged continuously and the second engaging means 22 is made of teeth 22a distributed discretely, they may employ either one of two arrangements.

Also, although the discrete teeth arrangement employed for the second engaging means 22 in the previous embodiment includes three teeth arrangements 21L, the number of the arrangement 21L is not limited thereto.

Further, the respective positions of the first and second engaging means 21, 22 are not limited to the previous embodiment and they may be arranged in different positions. For example, if the reel 3 is a flange-less reel, the first engaging means 21 may be provided on the bottom surface of the hub.

Furthermore, the position of the spring support portion 25 is not limited in the previous embodiment and it may be formed in different position and in different way.

Moreover, the bearing 29 is not limited to the radial bearing and it may be a thrust bearing or a bushing.

Further, a chamfered guide portion may be formed on the inner peripheral surface of the opening so as to guide the wall 13 into the opening 16.

Furthermore, although the coil spring 23 is used not only for connecting between the hub 10 and the support member 26 while allowing the axial movement of the hub 10 relative to the support member 26 but also for biasing the hub 10 toward the lower housing 1b, it may be replaced by a first mechanism for transmitting the rotation of the hub 10 to the support member 26 while allowing axial movement of the hub relative to the support member and a second mechanism for biasing the hub 10 toward the lower housing 1b. In this instance, the first mechanism may be constituted by a plurality of holes or recesses formed on one of the hub 10 and the support member 26 and pins or projections capable of engaging with the associated holes or recesses and formed on the other of the hub 10 and the support member 26. The second mechanism may be constituted by a plurality of springs such as coil springs and leaf springs or a plurality of elastic members made of elastic rubber, for example.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A tape cartridge comprising:
   a tape housing having an upper wall and a lower wall defining a tape housing therebetween, the lower wall having a circular opening defined therein through which a drive shaft can access;
   a first reel member positioned in the tape housing and supported by the upper wall for rotation about an axis extending through a center of the circular opening;
   a second reel member positioned in the tape housing for rotation about said axis and having an outer peripheral surface extending around the axis for winding the tape therearound;
   a connecting and biasing member mounted between the first and second reel members and connecting between the first and second reel members so that a rotation of the second reel member causes a rotation of the first reel member and biasing the first and second reel members away from each other toward the upper and lower walls, respectively;
   a first engaging means provided on an inner surface of the lower wall to oppose said second reel member; and
   a second engaging means provided on a lower surface of the second reel member to oppose said first engaging means so that, when the drive shaft is out of engagement with the second reel member, the second engaging means engages with the first engaging means due to a biasing force caused by the connecting and biasing member to prevent a rotation of the second reel member relative to the tape housing and, when the drive shaft engages with the second reel member through the opening and forces the second reel member toward the first reel member against the biasing force of the connecting and biasing member, a rotation of the drive shaft can be transmitted from the second reel member through the connecting and biasing member to the first reel member to cause simultaneous rotations of the first and the second reel members.

2. The tape cartridge of claim 1, wherein either or both of the first and the second engaging means have a number of teeth continuously or discretely arranged around the axis.

3. The tape cartridge of claim 2, wherein each of the teeth of the first and second engaging means has an intermediate surface extending substantially parallel to the axis.

* * * * *